United States Patent [19]

Johnson

[11] 4,095,386
[45] Jun. 20, 1978

[54] PRISMATIC INTERLOCKING STRUCTURAL MODULE

[76] Inventor: Joseph Daniel Johnson, 1101 E. Capitol St., Washington, D.C. 20003

[21] Appl. No.: 826,112

[22] Filed: Aug. 19, 1977

[51] Int. Cl.² .............................................. E04C 1/08
[52] U.S. Cl. ...................................... 52/575; 40/539; 46/30; 52/81; 52/311; 52/DIG. 10; 229/22
[58] Field of Search ..................... 229/8, 22; 40/124.1, 40/126 A; 52/81, 276, 311, DIG. 10, 574, 575; 428/542; 46/28, 30, 31

[56] References Cited

U.S. PATENT DOCUMENTS

| 1,870,688 | 8/1932 | Page | 229/8 |
|---|---|---|---|
| 2,549,189 | 4/1951 | Gabo | 428/542 |
| 2,860,439 | 11/1958 | Johnson | 40/124.1 X |
| 3,132,653 | 5/1964 | Gazik | 229/8 X |
| 3,203,124 | 8/1965 | Stoessel | 40/124.1 |
| 3,257,154 | 6/1966 | Lewis | 52/DIG. 10 |
| 3,654,717 | 4/1972 | Lane | 52/DIG. 10 |
| 3,665,882 | 5/1972 | Georgiev et al. | 52/DIG. 10 |
| 3,749,636 | 7/1973 | Tranquillitsky | 52/DIG. 10 |

FOREIGN PATENT DOCUMENTS

| 1,008,893 | 5/1952 | France | 52/574 |
|---|---|---|---|
| 857,548 | 9/1940 | France | 40/539 |
| 9,531 | 12/1838 | France | 52/575 |
| 962,450 | 7/1964 | United Kingdom | 40/124.1 |

*Primary Examiner*—Leslie Braun
*Attorney, Agent, or Firm*—Harold L. Stowell

[57] ABSTRACT

A structural module is provided having at least three triangular prismatic elements arranged such that a similar quadrangular sidewall of each prismatic element forms a common quadrangular wall of the entire module.

9 Claims, 21 Drawing Figures

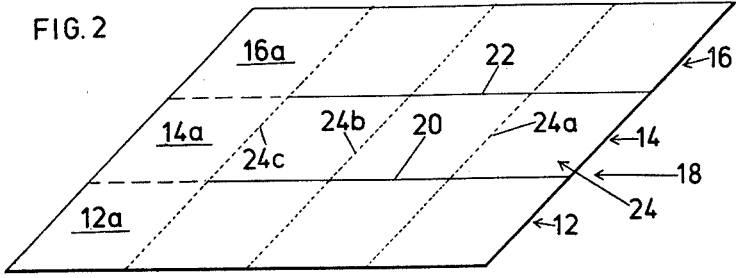
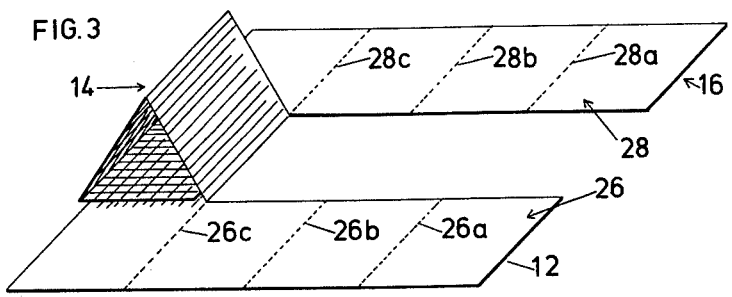
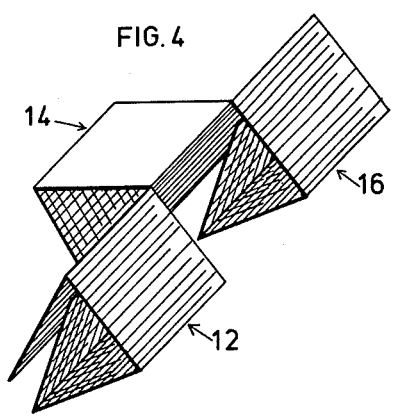
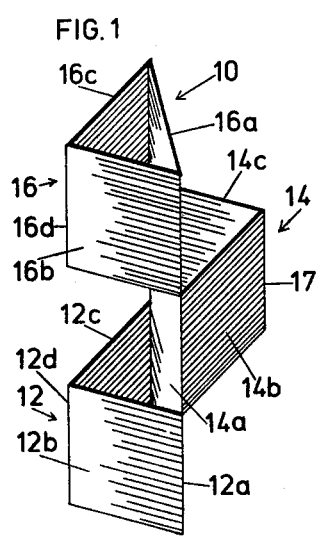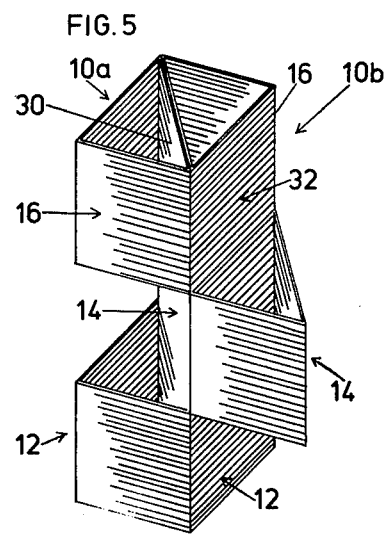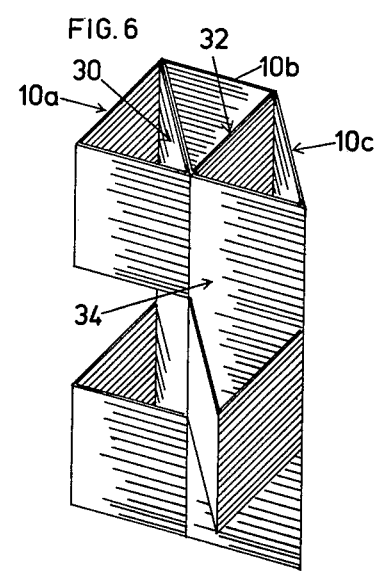

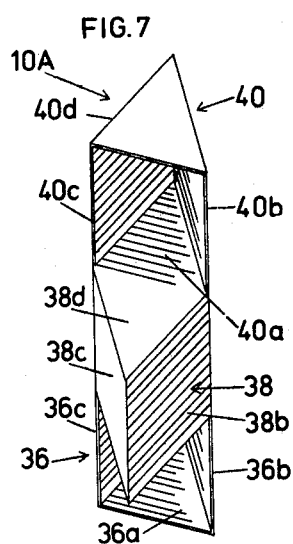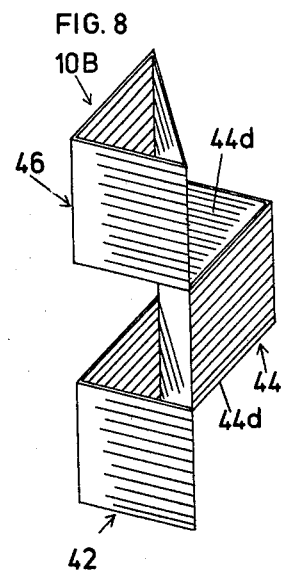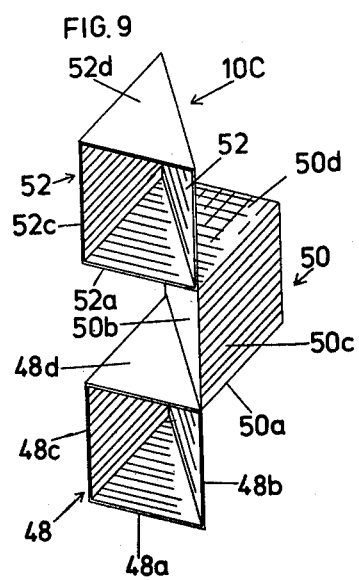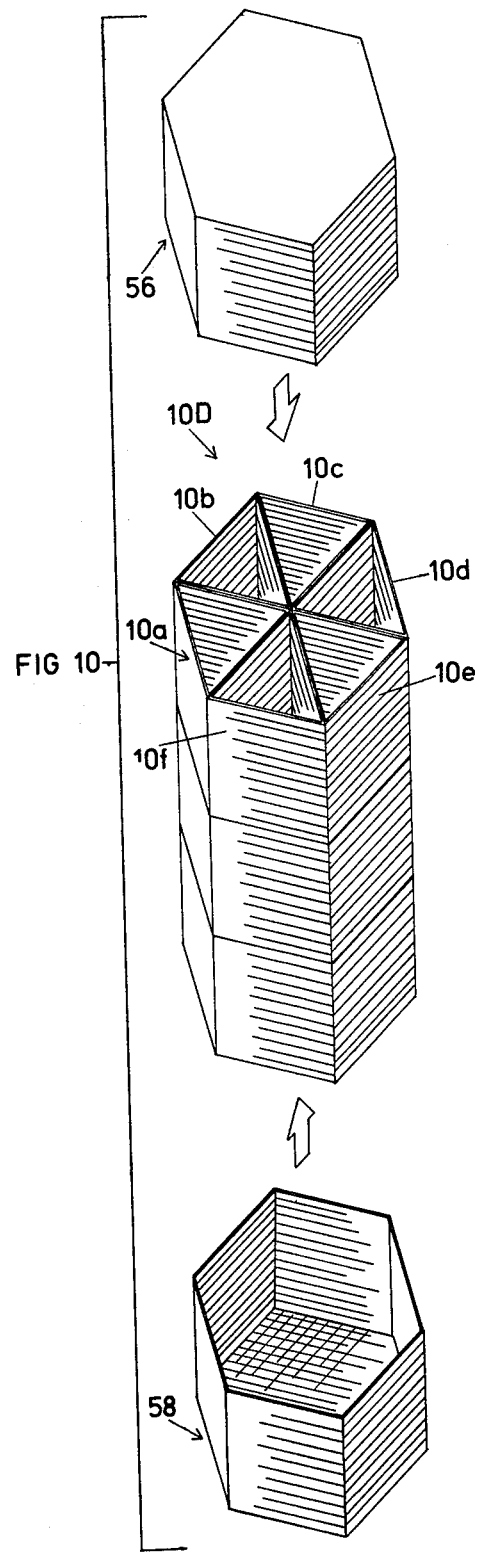

FIG. 15
FIG. 16
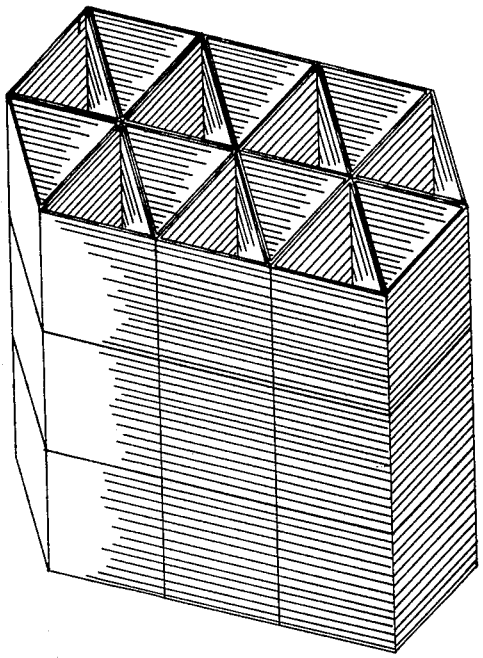
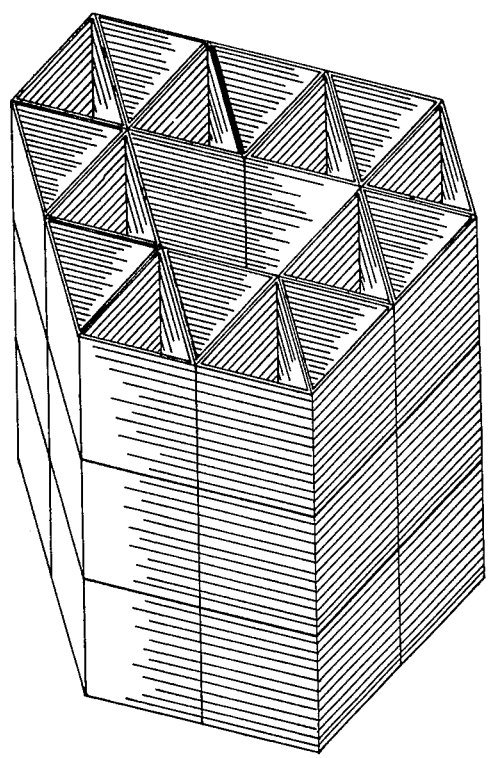
FIG. 17
FIG. 18
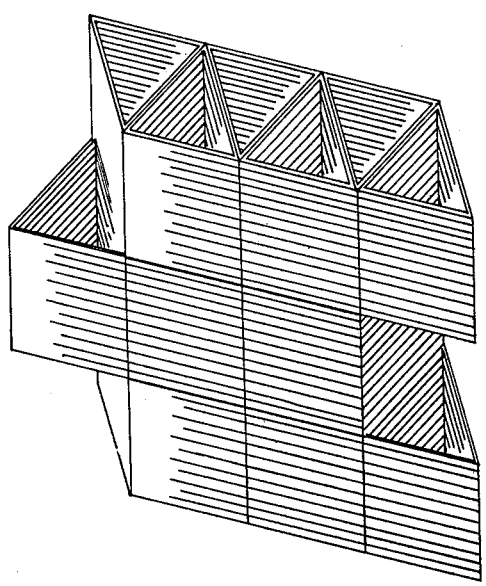
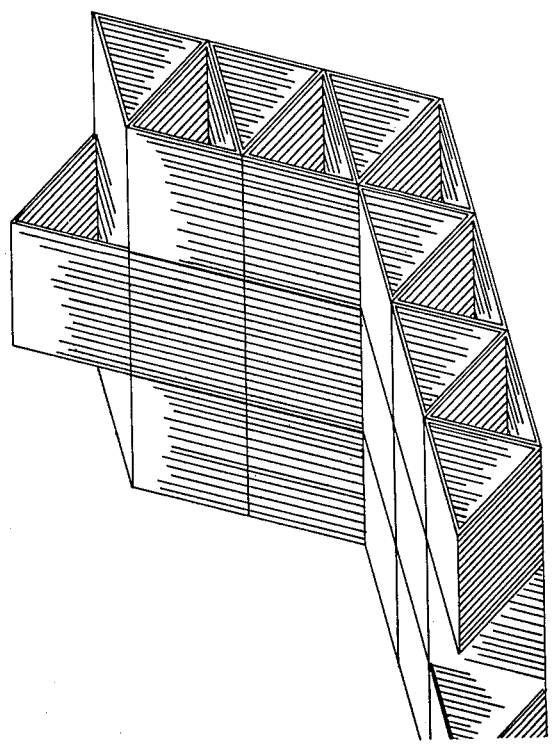

PRISMATIC INTERLOCKING STRUCTURAL MODULE

BACKGROUND OF THE INVENTION

1. Field of the Invention

The present invention relates to structural modules which may be used by itself or interlocked with other identical modules to provide a variety of structural configurations useful in the construction and decoration of homes, offices, plants, governmental and municipal buildings, etc., decorative and utilitarian objects outside of such structures, as toys, greeting cards and educational devices for children, and as packaging.

2. Description of the Prior Art

Space dividers are well known in the art and it is also known to construct space dividers so that plural units may be connected to provide a plurality of shapes and configurations and it is to this latter class of modular elements that the present invention is directed.

SUMMARY OF THE INVENTION

The present invention is directed to a structural module comprising at least three triangular prismatic elements arranged such that a similar quadrangular sidewall of each prismatic element forms a common quadrangular wall of the module. The invention may be further defined wherein each module is composed of three of said triangular prismatic elements with the other two sides of the first and third element lying in common planes and the common edge of the other two sides of the second element positioned 180° from the equivalent common edge of the first and third elements.

BRIEF DESCRIPTION OF THE DRAWING

The invention will be further described in reference to the accompanying drawing wherein:

FIG. 1 is an isometric view of one form of the module of the present invention;

FIGS. 2, 3 and 4 illustrate one method of constructing the module shown in FIG. 1 from a plain sheet of material;

FIG. 5 is an isometric view of a pair of the modules illustrated in FIG. 1 connected together;

FIG. 6 is a view like FIG. 5 of three of the modules of FIG. 1 connected together;

FIGS. 7, 8, and 9 are isometric views of modified forms of the basic module;

FIG. 10 is an exploded isometric view of six of the modules illustrated in FIG. 1 arranged to form a hexagonal column and illustrating base and cap members therefore;

FIGS. 11 through 18 are isometric views of selected structural arrangements of connected modules of the type illustrated, for example, in FIG. 1 of the drawing;

DESCRIPTION OF THE PREFERRED EMBODIMENTS

Figure 11:
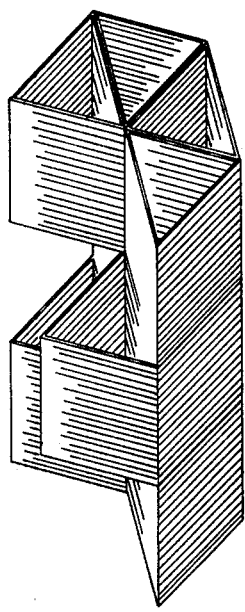
Figure 12:
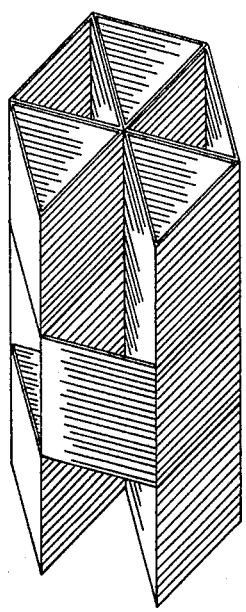
Figure 13:
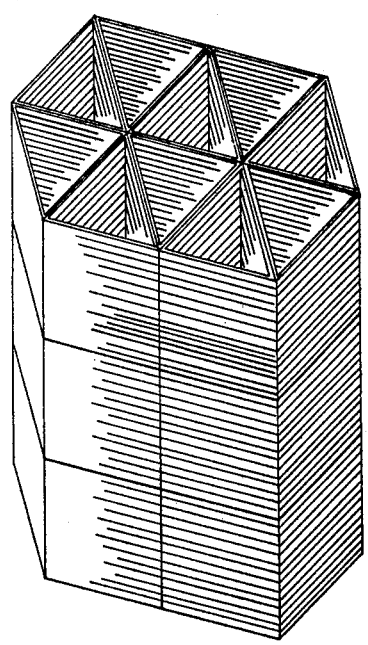
Figure 14:
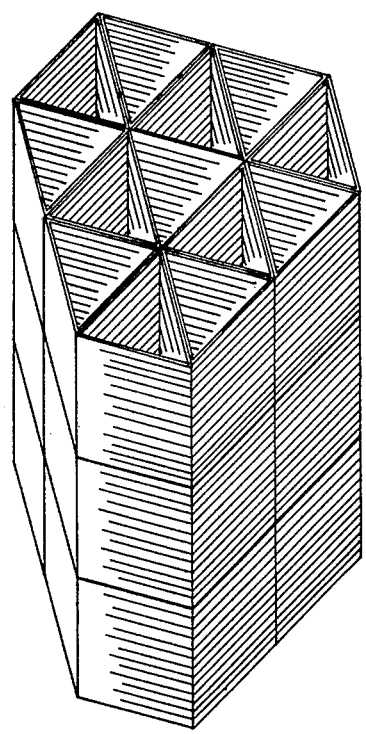

Referring to FIG. 1 of the drawing, there is shown an embodiment of the prismatic module comprising the present invention. The module generally designated 10 is composed of three triangular prisms 12, 14 and 16. Each of the triangular prisms has a base 12a, 14a and 16a respectively, and a pair of sides 12b, 12c, 14b, 14c, 16b, and 16c respectively.

In forming the module 10, the bases 12a, 14a and 16a of the three triangular prisms 12, 14 and 16 are positioned in a common plane and the first prism 12 and the third prism 16 are positioned with their remaining sides 12b and 16b and 12c and 16c in the same plane. The second prismatic element 14 has its two sides so positioned that the line 17 joining the sides 14b and 14c is directed 180° from the corresponding lines 12d and 16d of prisms 12 and 16.

In the illustrated form of construction, the triangular ends of each of the triangular prismatic elements 12, 14 and 16 are open. However, as to be more fully described hereinafter, such triangular ends may be closed and other sides and/or the base of the elements may be of open construction. Further, instead of the unit 10 being of hollow construction, the unit may be composed of solid prismatic elements or a part of the prismatic elements may be solid while others are hollow, all as to be more fully described hereinafter.

Referring now to FIGS. 2, 3 and 4, there is illustrated a method of constructing the hollow prismatic element illustrated in FIG. 1. In the drawings, FIGS. 2, 3 and 4, a sheet of material designated 18, which may be metal, paper, plastic, wood or various laminations of metal, plastic and paper is lined of into nine equal quadrangles and one larger quadrangle which will form the common base 12a, 14a and 16a of triangular prisms 12, 14 and 16 of FIG. 1.

The next step in forming the module is to cut along lines 20 and 22 and then the center section generally designated 24 is folded along fold lines 24a, 24b and 24c to form triangular prism 14.

The next step is to fold segments 26 and 28 along fold lines 26a, 26b and 26c and 28a, 28b and 28c in the opposite direction to that employed in folding prismatic element 14, all as depicted in FIG. 4 of the drawing. The final step is to glue or other ways attach folded portions bound by the margins and fold lines 26a and 28a to their respective bases 12a and 16a as was done in respect to prismatic element 14. When this step is completed, a module as illustrated in FIG. 1 is provided.

The foregoing is an example of forming a module from flat sheet stacks. It will, of course, be recognized by those skilled in the art that each module may be formed by assembly of six or nine quadrangular sheets or an entire moldule may be cast as a unit or made from extrusions.

Referring now to FIG. 5, there is shown two of the modules constructed as shown in FIG. 1 and designated 10a and 10b assembled or connected together. In FIG. 5 the common base of module 10a is indicated at 30, the common base of module 10b is designated 32 and the triangular prismatic elements of each of the two modules 10a and 10b are designated 12, 14 and 16.

Referring now to FIG. 6, there is illustrated a module like that shown in FIG. 5 having one additional module attached thereto. Thus, the assembly of FIG. 6 consist of modulars 10a, 10b and 10c and the common bases of each are designated 30, 32 and 34 respectively.

Referring now to FIG. 7 a modified form of the module generally designated 10A is shown. The module 10A consist of three prismatic elements 36, 38 and 40. Prismatic element 36 comprises an end 36a, a pair of sidewalls 36b and 36c and an end wall (not shown). Prismatic element 38 compises sidewalls 38b and 38c, end walls 38d and a further end wall (not shown). Prismatic element 40 has end walls 40a and 40d and sidewalls 40b and 40c. Other than the differences in the number of walls and whether the walls are open or closed, the module of FIG. 7 is like that of FIG. 1.

Referring now to FIG. 8, a further modified module designated 10B is shown and it is composed of three prismatic elements 42, 44 and 46. Prismatic elements 42 and 46 are identical to prismatic elements 12 and 16 of the FIG. 1 form of the invention and prismatic element 44 is like prismatic element 14 of the FIG. 1 form of the invention, except that end walls are provided for said element with the illustrated end walls being designated 44d.

Referring now to FIG. 9, another form of the module of the invention designated 10C is illustrated. The module 10C is composed of three triangular prismatic elements 48, 50 and 52. Prismatic element 48 has base 48b, end walls 48a and 48d and a single side wall 48c. Prismatic element 50 has end walls 50a and 50d, base 50b and a single side wall 50c, whereas prismatic element 52 has end walls 52a and 52d, base 52b and a single end wall 52c. This form of the module is particularly useful in that it provides internal storage areas as does the module of FIG. 7.

Referring now to FIG. 10, there is illustrated a unit generally designated 10D composed of six modules of the type illustrated in FIG. 1 and designated 10a, 10b, 10c, 10d, 10e, and 10f, plus a of cap and base member designated 56 and 58. Each cap and base 56 and 58 is in the form of a regular hexagon. The cap and base maintain the six modules 10a–10f in their designated configuration. Such a unit has considerable strength and could be used as a load-bearing structure.

Referring now to FIGS. 11–18, there are illustrated various arrangements of the module illustrated in FIG. 1. In FIG. 11, four of the modules are connected; in FIG. 12, five of the modules are connected; in FIG. 13, eight of the modules are connected; in FIG. 14, nine of the modules are connected together; in FIG. 15, ten of the modules are connected together; in FIG. 16, eleven of the modules are connected together; in FIG. 17, six of the modules are connected together in a rectilinear pattern and, in FIG. 18, eight of the modules are connected together in to an angular form of pattern.

Figure 19:
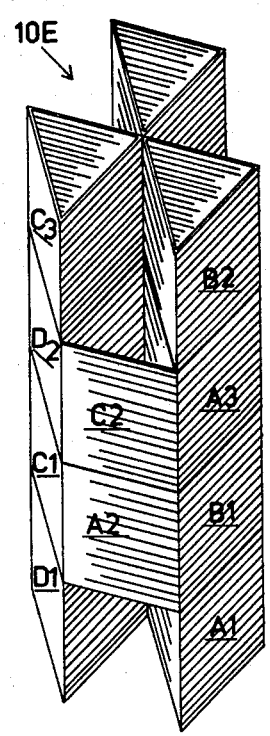
FIG. 19 illustrates how six of the modules of the type illustrated in FIG. 1 may be connected in a side-by-side and stacked array.

Referring now to FIG. 19, the unique structure shown therein is formed from six of the modules shown in FIG. 1 of the drawing. This assembly illustrates how side-by-side and stacked modules of the invention may be utilized. The module 10E is composed of six prismatic elements and the outer exposed quadrangular faces of four of the prismatic elements are designated A , A , and A ; B and B ; C , C , and C and D and D with faces A and C corresponding to faces 14c and 14b respectively of prism 14 of FIG. 1. The other faces correspond with the faces of prismatic element 10 of FIG. 1 as follows:

$A = 12c$
$A = 16c$
$B = 12b$
$B = 16b$
$C = 12b$
$C = 16b$
$D = 12c$
$D = 16c$

Figure 21:
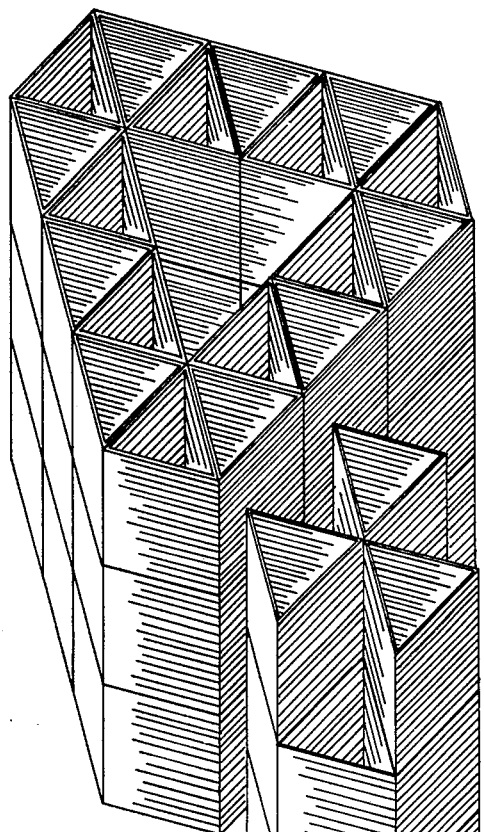
FIGS. 20 and 21 illustrate other side-by-side and stacked configurations of the array shown in FIG. 19.
Figure 20:
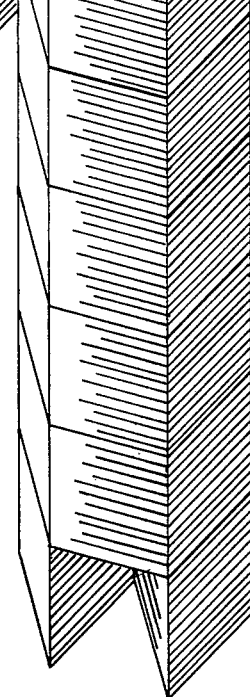

FIGS. 20 and 21 illustrate other side-by-side and stacked configurations with the structure of FIG. 20 being composed of 12 modules and that of FIG. 21 being composed of 18 modules.

From the foregoing description, it will be seen that the present invention provides a basic unit which can be connected into a plurality of useful structures having both utilitarian and asthetic values.

While various modifications of the present invention have been illustrated and described, it will be recognized by those skilled in the art that various modifications may be made without departing from the scope of the present invention.

I claim:

1. A structural module comprising at least three triangular prismatic elements, each of said elements comprising at least a base and a pair of side walls, said bases of said triangular elements being in rectilinear alignment and forming a common quadrangular wall of the module with the common edge of the side walls of the elements alternating on opposite sides of the common quadrangular wall.

2. The invention defined in claim 1 wherein each module is composed of three of said triangular prismatic elements 1.

3. The invention defined in claim 2 wherein each triangular prismatic element is similar.

4. The invention defined in claim 3 wherein each triangular prismatic element is equalateral.

5. The invention defined in claim 1 wherein each triangular prismatic element is hollow.

6. The invention defined in claim 1 wherein a plurality of said modular units are connected in a rectilinear array.

7. The invention defined in claim 1 wherein a plurality of said modular units are connected in a closed array.

8. The invention defined in claim 1 wherein a plurality of the modular elements are connected in a pair of rectilinear arrays.

9. The invention defined in claim 1 wherein said modular element is formed from a planar rectangular sheet of material.

* * * * *